United States Patent
Amartur

(10) Patent No.: US 6,812,478 B2
(45) Date of Patent: Nov. 2, 2004

(54) IN-SITU DETECTION OF THIN-METAL INTERFACE USING OPTICAL INTERFERENCE VIA A DYNAMICALLY UPDATED REFERENCE

(75) Inventor: Sundar Amartur, Fremont, CA (US)

(73) Assignee: Lam Research Corporation, Fremont, CA (US)

( * ) Notice: Subject to any disclaimer, the term of this patent is extended or adjusted under 35 U.S.C. 154(b) by 373 days.

(21) Appl. No.: 09/976,442

(22) Filed: Oct. 12, 2001

(65) Prior Publication Data

US 2004/0016895 A1 Jan. 29, 2004

Related U.S. Application Data

(63) Continuation-in-part of application No. 09/812,535, filed on Mar. 19, 2001.

(51) Int. Cl.[7] .............................................. G01B 11/02
(52) U.S. Cl. .................................. 250/559.29; 356/503
(58) Field of Search ....................... 250/559.29, 559.32, 250/559.38, 559.39, 559.22, 559.2; 356/503, 504, 630, 632

(56) References Cited

U.S. PATENT DOCUMENTS

| 6,028,669 | A | * | 2/2000 | Tzeng | ......................... 356/504 |
| 6,110,752 | A | | 8/2000 | Litvak | |
| 6,179,691 | B1 | | 1/2001 | Lee et al. | |
| 6,204,922 | B1 | * | 3/2001 | Chalmers | ..................... 356/630 |
| 6,208,425 | B1 | * | 3/2001 | Sandhu et al. | ............... 356/503 |
| 6,271,047 | B1 | | 8/2001 | Ushio et al. | |

FOREIGN PATENT DOCUMENTS

| JP | 2000-77371 | 3/2000 |
| JP | 2000077371 | 3/2000 |

* cited by examiner

*Primary Examiner*—David V. Bruce
*Assistant Examiner*—Hoon Song
(74) *Attorney, Agent, or Firm*—Martine & Penilla, LLP

(57) ABSTRACT

An invention for detecting an endpoint during a chemical mechanical polishing (CMP) process is provided. A reflected spectrum data sample is received that corresponds to a plurality of spectrums of light reflected from an illuminated portion of the surface of a wafer. The reflected spectrum data sample is normalized using a normalization reference comprising a first reflected spectrum data sample obtained earlier during the CMP process. In addition, the normalization reference is updated during the process using a second reflected spectrum data sample obtained earlier during the CMP process. The second reflected spectrum data sample is obtained after the first reflected spectrum data sample. In this manner, an endpoint is determined based on optical interference occurring in the reflected spectrum data.

20 Claims, 14 Drawing Sheets

IN-SITU DETECTION OF THIN-METAL INTERFACE USING OPTICAL INTERFERENCE VIA A DYNAMICALLY UPDATED REFERENCE

CROSS REFERENCE TO RELATED APPLICATIONS

This application is a continuation-in-part of U.S. patent application Ser. No. 09/812,535, filed Mar. 19, 2001, entitled "In-Situ Detection of Thin-Metal Interface Using Optical Interference," and is related to U.S. patent application Ser. No. 09/976,579, filed Oct. 12, 2001, entitled "In-Situ Detection of Thin-Metal Interface Using High Resolution Spectral Analysis of Optical Interference," both of which are incorporated herein by reference.

BACKGROUND OF THE INVENTION

1. Field of the Invention

This invention relates generally to endpoint detection in a chemical mechanical polishing process, and more particularly to endpoint detection using optical interference of a broad reflectance spectrum and a continuously updated reference.

2. Description of the Related Art

In the fabrication of semiconductor devices, typically, the integrated circuit devices are in the form of multi-level structures. At the substrate level, transistor devices having diffusion regions are formed In subsequent levels, interconnect metallization lines are patterned and electrically connected to the transistor devices to define the desired functional device. As is well known, patterned conductive layers are insulated from other conductive layers by dielectric materials, such as silicon dioxide. As more metallization levels and associated dielectric layers are formed, the need to planarize the dielectric material increases. Without planarization, fabrication of additional metallization layers becomes substantially more difficult due to the higher variations in the surface topography. In other applications, metallization line patterns are formed in the dielectric material, and then metal chemical mechanical polishing (CMP) operations are performed to remove excess metallization.

In the prior art, CMP systems typically implement belt, orbital, or brush stations in which belts, pads, or brushes are used to scrub, buff, and polish one or both sides of a wafer. Slurry is used to facilitate and enhance the CMP operation. Slurry is most usually introduced onto a moving preparation surface, e.g., belt, pad, brush, and the like, and distributed over the preparation surface as well as the surface of the semiconductor wafer being buffed, polished, or otherwise prepared by the CMP process. The distribution is generally accomplished by a combination of the movement of the preparation surface, the movement of the semiconductor wafer and the friction created between the semiconductor wafer and the preparation surface.

FIG. 1A shows a cross sectional view of a dielectric layer 102 undergoing a fabrication process that is common in constructing damascene and dual damascene interconnect metallization lines. The dielectric layer 102 has a diffusion barrier layer 104 deposited over the etch-patterned surface of the dielectric layer 102. The diffusion barrier layer, as is well known, is typically titanium nitride (TiN), tantalum (Ta), tantalum nitride TaN) or a combination of tantalum nitride (TaN) and tantalum (Ta). Once the diffusion barrier layer 104 has been deposited to the desired thickness, a copper layer 106 is formed over the diffusion barrier layer in a way that fills the etched features in the dielectric layer 102. Some excessive diffusion barrier and metallization material is also inevitably deposited over the field areas. In order to remove these overburden materials and to define the desired interconnect metallization lines and associated vias (not shown), a chemical mechanical planarization (CMP) operation is performed.

As mentioned above, the CMP operation is designed to remove the top metallization material from over the dielectric layer 102. For instance, as shown in FIG. 1B, the overburden portion of the copper layer 106 and the diffusion barrier layer 104 have been removed. As is common in CMP operations, the CMP operation must continue until all of the overburden metallization and diffusion barrier material 104 is removed from over the dielectric layer 102. However, in order to ensure that all the diffusion barrier layer 104 is removed from over the dielectric layer 1021 there needs to be a way of monitoring the process state and the state of the wafer surface during its CMP processing. This is commonly referred to as endpoint detection. Endpoint detection for copper is performed because copper cannot be successfully polished using a timed method. A timed polish does not work with copper because the removal rate from a CMP process is not stable enough for a timed polish of a copper layer. The removal rate for copper from a CMP process varies greatly. Hence, monitoring is needed to determine when the endpoint has been reached. In multi-step CMP operations there is a need to ascertain multiple endpoints: (1) to ensure that Cu is removed from over the diffusion barrier layer; (2) to ensure that the diffusion barrier layer is removed from over the dielectric layer. Thus, endpoint detection techniques are used to ensure that all of the desired overburden material is removed.

Many approaches have been proposed for the endpoint detection in CMP of metal. The prior art methods generally can be classified as direct and indirect detection of the physical state of polish. Direct methods use an explicit external signal source or chemical agent to probe the wafer state during the polish. The indirect methods on the other hand monitor the signal internally generated within the tool due to physical or chemical changes that occur naturally during the polishing process.

Indirect endpoint detection methods include monitoring: the temperature of the polishing pad/wafer surface, vibration of polishing tool, frictional forces between the pad and the polishing head, electrochemical potential of the slurry, and acoustic emission. Temperature methods exploit the exothermic process reaction as the polishing slurry reacts selectively with the metal film being polished. U.S. Pat. No. 5,643,050 is an example of this approach. U.S. Pat. No. 5,643,050 and U.S. Pat. No. 5,308,438 disclose friction-based methods in which motor current changes are monitored as different metal layers are polished.

Another endpoint detection method disclosed in European application EP 0 739 687 A2 demodulates the acoustic emission resulting from the grinding process to yield information on the polishing process. Acoustic emission monitoring is generally used to detect the metal endpoint. The method monitors the grinding action that takes place during polishing. A microphone is positioned at a predetermined distance from the wafer to sense acoustical waves generated when the depth of material removal reaches a certain determinable distance from the interface to thereby generate output detection signals. All these methods provide a global measure of the polish state and have a strong dependence on process parameter settings and the selection of consumables. However, none of the methods except for the friction sensing have achieved some commercial success in the industry.

Direct endpoint detection methods monitor the wafer surface using acoustic wave velocity, optical reflectance and interference, impedance/conductance, electrochemical potential change due to the introduction of specific chemical agents. U.S. Pat. No. 5,399,234 and U.S. Pat. No. 5,271,274 disclose methods of endpoint detection for metal using acoustic waves. These patents describe an approach to monitor the acoustic wave velocity propagated through the wafer/slurry to detect the metal endpoint. When there is a transition from one metal layer into another, the acoustic wave velocity changes and this has been used for the detection of endpoint. Further, U.S. Pat. No. 6,186,865 discloses a method of endpoint detection using a sensor to monitor fluid pressure from a fluid bearing located under the polishing pad. The sensor is used to detect a change in the fluid pressure during polishing, which corresponds to a change in the shear force when polishing transitions from one material layer to the next. Unfortunately, this method is not robust to process changes. Further, the endpoint detected is global, and thus the method cannot detect a local endpoint at a specific point on the wafer surface. Moreover, the method of the 6,186,865 patent is restricted to a linear polisher, which requires an air bearing.

There have been many proposals to detect the endpoint using the optical reflectance from the wafer surface. They can be grouped into two categories: monitoring the reflected optical signal at a single wavelength using a laser source or using a broad band light source covering the full visible range of the electromagnetic spectrum. U.S. Pat. No. 5,433,651 discloses an endpoint detection method using a single wavelength in which an optical signal from a laser source is impinged on the wafer surface and the reflected signal is monitored for endpoint detection. The change in the reflectivity as the polish transfers from one metal to another is used to detect the transition.

Broad band methods rely on using information in multiple wavelengths of the electromagnetic spectrum. U.S. Pat. No. 6,106,662 discloses using a spectrometer to acquire an intensity spectrum of reflected light in the visible range of the optical spectrum. Two bands of wavelengths are selected in the spectra that provide good sensitivity to reflectivity change as polish transfers from one metal to another. A detection signal is then defined by computing the ratio of the average intensity in the two bands selected. Significant shifts in the detection signal indicate the transition from one metal to another.

A common problem with current endpoint detection techniques is that some degree of over-etching is required to ensure that all of the conductive material (e.g., metallization material or diffusion barrier layer 104) is removed from over the dielectric layer 102 to prevent inadvertent electrical interconnection between metallization lines. A side effect of improper endpoint detection or over-polishing is that dishing 108 occurs over the metallization layer that is desired to remain within the dielectric layer 102. The dishing effect essentially removes more metallization material than desired and leaves a dish-like feature over the metallization lines. Dishing is known to impact the performance of the interconnect metallization lines in a negative way, and too much dishing can cause a desired integrated circuit to fail for its intended purpose.

In view of the foregoing, there is a need for endpoint detection systems and methods that improve accuracy in endpoint detection. In addition, the systems and methods should be able to accurately determine film and layer thickness.

SUMMARY OF THE INVENTION

Broadly speaking, the present invention fills these needs by providing an optical endpoint detection system that utilizes optical interference to determine when an endpoint has been reached, such as when metal layer has reached a thin metal zone during a CMP process. To address ambient light noise, embodiments of the present invention utilize a continuously updated dynamic normalization reference. In one embodiment, a method for detecting an endpoint during a chemical mechanical polishing (CMP) process is disclosed. A reflected spectrum data sample is received that corresponds to a plurality of spectrums of light reflected from an illuminated portion of the surface of a wafer. The reflected spectrum data sample is normalized using a normalization reference comprising a reflected spectrum data sample obtained earlier during the CMP process. In addition, the normalization reference is updated during the process using a second reflected spectrum data sample obtained earlier during the CMP process. The second reflected spectrum data sample is obtained after the first reflected spectrum data sample. In this manner, an endpoint is determined based on optical interference occurring in the reflected spectrum data.

In another embodiment, a median vector filter based method is disclosed for detecting an endpoint during a chemical mechanical polishing (CMP) process. As above, a reflected spectrum data sample is received corresponding to a plurality of spectrums of light reflected from an illuminated portion of the surface of a wafer. A first median reflected spectrum data sample is selected from a first plurality of reflected spectrum data samples obtained earlier during the CMP process. The current reflected spectrum data sample is normalized using a normalization reference comprising the median reflected spectrum data sample. In addition, the normalization reference is updated using a second median reflected spectrum data sample selected from a second plurality of reflected spectrum data samples obtained earlier during the CMP process. As above, an endpoint is determined based on optical interference occurring in the reflected spectrum data Another method for detecting an endpoint during a chemical mechanical polishing process is disclosed in a further embodiment of the present invention. A portion of a surface of a wafer is illuminated with broad band light, and a current reflected spectrum data sample is received corresponding to a plurality of spectrums of light reflected from the illuminated portion of the surface of the wafer. The current reflected spectrum data sample is normalized using a normalization reference comprising a first reflected spectrum data sample obtained earlier during the CMP process, and an endpoint is determined based on optical interference occurring in the reflected spectrum data. In addition, the normalization reference is updated using a second reflected spectrum data sample obtained earlier during the CMP process, wherein the second reflected spectrum data sample is obtained after the first reflected spectrum data sample. In one aspect, the first reflected spectrum data sample trails the current reflected spectrum data sample by a predetermined trailing reference delay, which can be a number representing an amount of reflectance data samples between the current reflected spectrum data sample and the first reflected spectrum data sample. In addition, a new current reflected spectrum data sample can be obtained corresponding to a plurality of spectrums of light reflected from the illuminated portion of the surface of the wafer at a later time. In this case, the second reflected spectrum data sample can trail the new current reflected spectrum data sample by the trailing reference delay.

Advantageously, the dynamic normalization reference of the embodiments of the present invention reduces endpoint detection error by addressing the changing characteristics of the extraneous ambient light in the optical path. Further, the embodiments of the present invention use optical interference instead of mere changes in the surface reflectivity as in conventional endpoint detection. Thus, the embodiments of the present invention advantageously provide increased sensitivity and robustness in endpoint detection. In addition to endpoint detection, the embodiments of the present invention advantageously can be used to determine the thickness of the dielectric layers in the wafer after the metal overburden is removed. Conventionally, an off line metrology tool was needed to measure the thickness of the layers of the wafer. The embodiments of the present invention can measure the thickness of the layers of the wafer without needing to remove the wafer and measure from a separate machine. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for optical endpoint detection. The present invention provides an optical endpoint detection system that utilizes a dynamically updated reference to aid in measurement of optical interference to determine when a metal layer has reached a thin metal zone during a CMP process. In particular, the dynamically updated reference is used to reduce the effect of ambient light on the detection process. As a result, an endpoint is determined based on optical interference occurring in the reflected spectrum data, which is a result of phase differences in light reflected from different layers of the wafer, and occurs when the top metal layer is reduced to the thin metal zone. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1A:
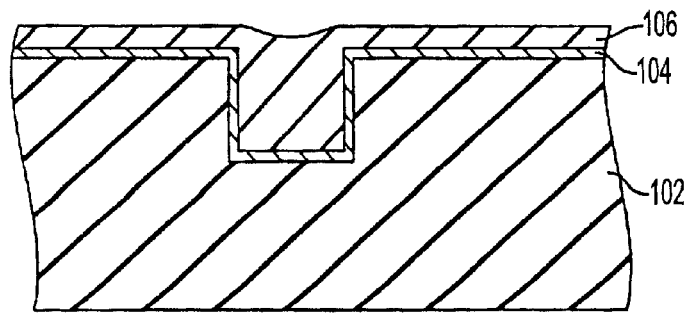
FIG. 1A shows a cross sectional view of a dielectric layer undergoing a fabrication process that is common in constructing damascene and dual damascene interconnect metallization lines.
Figure 1B:
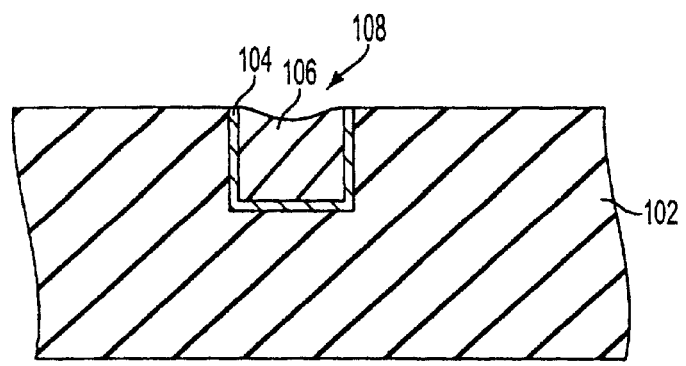
FIG. 1B is an illustration showing the overburden portion of the copper layer and the diffusion barrier layer having been removed by a CMP process.
Figure 2A:
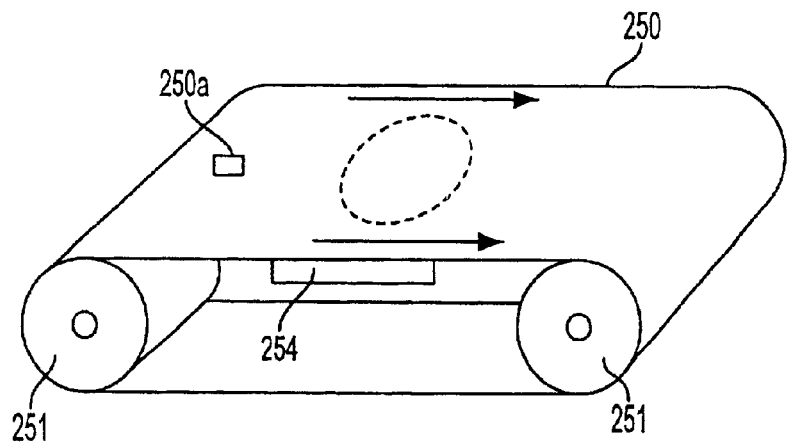
FIG. 2A shows a CMP system in which a pad is designed to rotate around rollers, in accordance with an embodiment of the present invention.
Figure 2B:
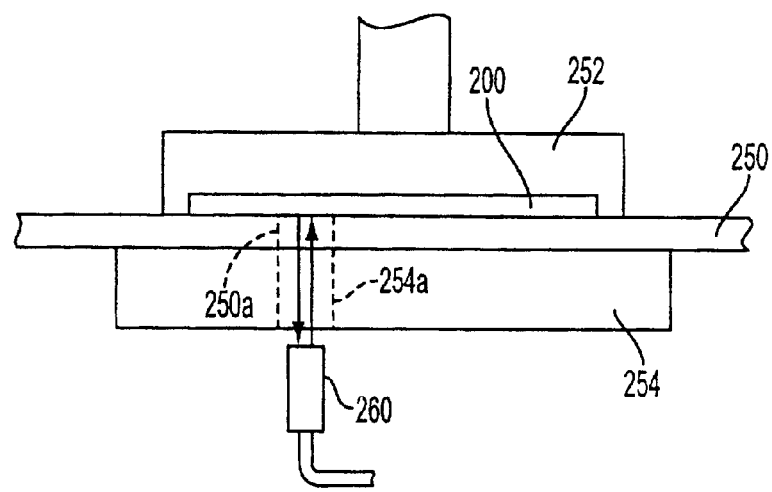
FIG. 2B is an illustration showing an endpoint detection system, in accordance with an embodiment of the present invention.

FIG. 2A shows a CMP system in which a pad 250 is designed to rotate around rollers 251, in accordance with an embodiment of the present invention. A platen 254 is positioned under the pad 250 to provide a surface onto which a wafer will be applied using a carrier 252. Endpoint detection is performed using an optical detector 260 in which light is applied through the platen 254, through the pad 250 and onto the surface of the wafer 200 being polished, as shown FIG. 2B. In order to accomplish optical endpoint detection, a pad slot 250a is formed into the pad 250. In some embodiments, the pad 250 may include a number of pad slots 250a strategically placed in different locations of the pad 250. Typically, the pad slots 250a are designed small enough to minimize the impact on the polishing operation. In addition to the pad slot 250a, a platen slot 254a is defined in the platen 254. The platen slot 254a is designed to allow the broad band optical beam to be passed through the platen 254, through the pad 250, and onto the desired surface of the wafer 200 during polishing.

By using the optical detector 260, it is possible to ascertain a level of removal of certain films from the wafer surface. This detection technique is designed to measure the thickness of the film by inspecting the interference patterns received by the optical detector 260. Additionally, the platen 254 is designed to strategically apply certain degrees of back pressure to the pad 250 to enable precision removal of the layers from the wafer 200.

Figure 3:
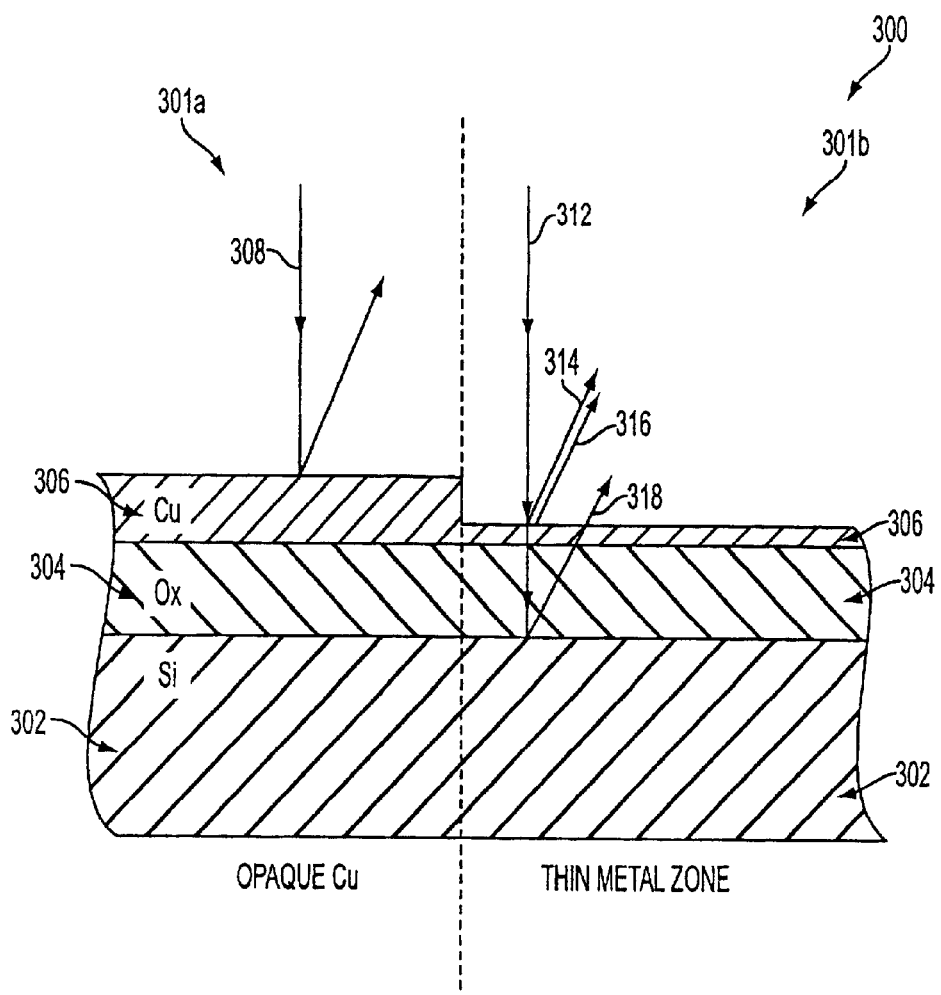
FIG. 3 is a diagram showing a portion of a wafer illuminated by a multi-spectral light during a CMP process, in accordance with an embodiment of the present invention.

FIG. 3 is a diagram showing a portion of a wafer 300 illuminated by a broad band light source during a CMP process, in accordance with an embodiment of the present invention. The wafer 300 includes a silicon substrate 302, an oxide layer 304 disposed over the substrate 302, and a copper layer 306 formed over the oxide layer 304. The copper layer 306 represents overburdened copper formed during a Damascene CMP process. Generally, the copper layer 306 is deposited over the oxide layer 304, which is etched in an earlier step to form trenches for copper interconnects. The overburden copper is then removed by polishing to expose the oxide layer 304, thus leaving only the conductive lines within the trenches. Dual Damascene occurs in a similar manner and allows the formation of metal plugs and interconnects at the same time.

During the polishing process, embodiments of the present invention utilize optical interference to determine when the copper 306 has been removed. Initially, shown in view 301a, the copper layer 306 is relatively thick, about 10,000 Å, and thus opaque. At this point, the light 308 that illuminates the surface of the wafer 300 is reflected back with little or no interference. Then, as the copper is polished down, the copper layer 306 becomes a thin metal, at about 300–400 Å. This is known as the thin metal zone. At this point, shown in view 301b, the copper layer 306 becomes transparent and light can pass through the copper layer 306 to illuminate the layers beneath.

When the light 312 begins penetrating the various layers of the wafer optical interference occurs. Each layer of the wafer has a reflective index, which is a property that defines the layer's affect on the velocity of the light 312 as it passes from one layer to another. Hence, the velocity of the light 312 changes as the light 312 passes from one material to another.

At each layer interface the light 312 gets reflected and comes back to the optical detector. Since the velocity has changed inside the material, a phase change occurs.

Thus, there is a phase difference between the light 314 reflected from the surface of the copper layer 306 and the light 316 reflected from the surface of the oxide layer 304. Similarly, them is a phase difference between the light 316 reflected from the surface of the oxide layer 304 and the light 318 reflected from the surface of the substrate 302. When the various reflected light rays 314, 316, and 318 interact an optical interference occurs.

Thus, when the copper layer 306 is thick, a phase change does not occur because the light 308 cannot penetrate the copper layer 306, and thus no interference occurs. However, when the copper layer 306 becomes very thin and transparent, interference occurs because phase changes occur between the light reflected from the various layers of the wafer 300. At this point, the polishing process should be halted.

Figure 4:
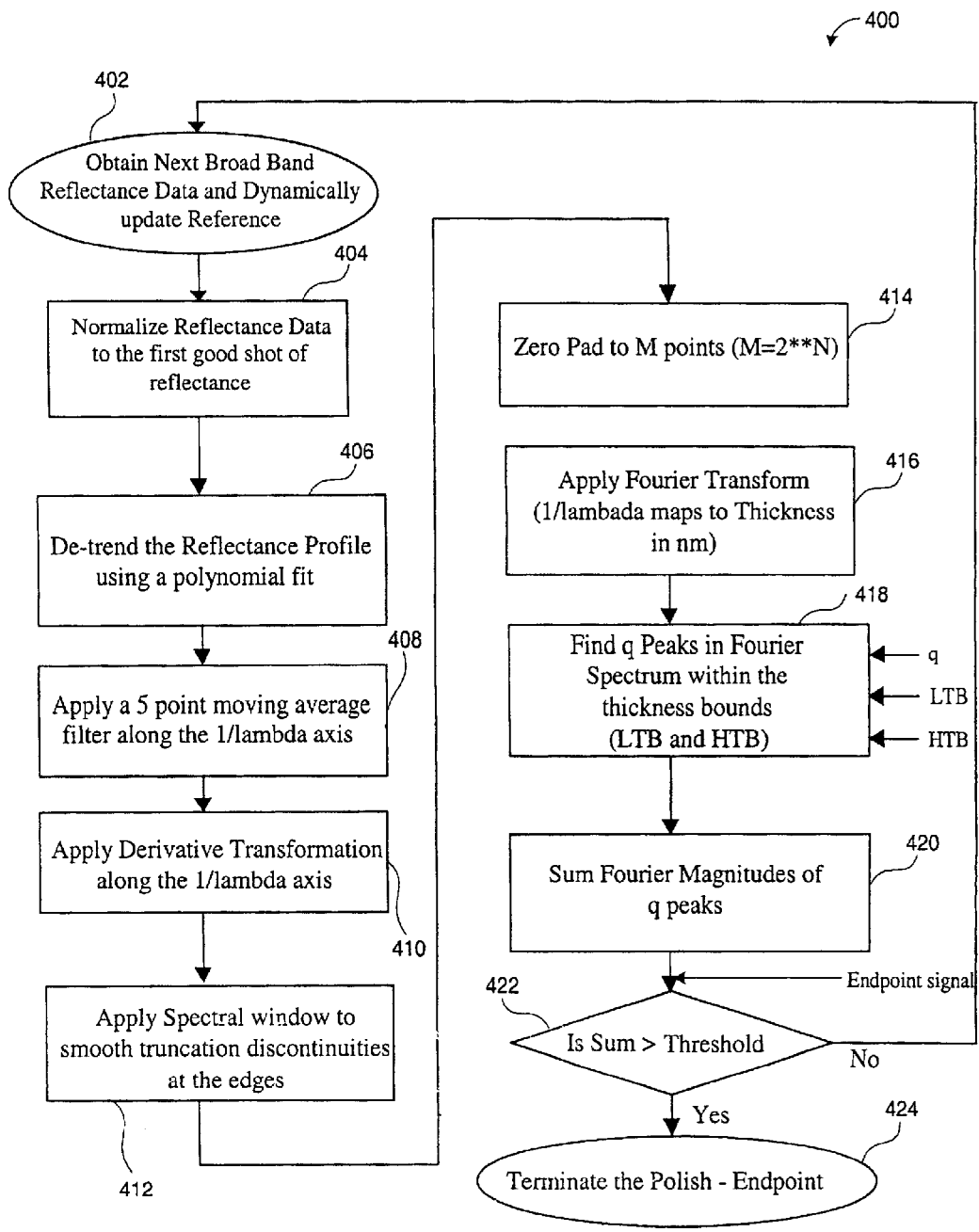
FIG. 4 is a flowchart showing a method for detecting an endpoint during a chemical mechanical polishing process, in accordance with an embodiment of the present invention.

FIG. 4 is a flowchart showing a method 400 for detecting an endpoint during a chemical mechanical polishing process, in accordance with an embodiment of the present invention. In operation 402, broad band reflectance data is obtained and the normalization reference is dynamically updated. The broad band reflectance data is obtained by illuminating a portion of the surface of the wafer with a broad band light source. Reflected spectrum data is then received corresponding to the spectrums of light reflected from the illuminated portion of the surface of the wafer.

Figure 5:
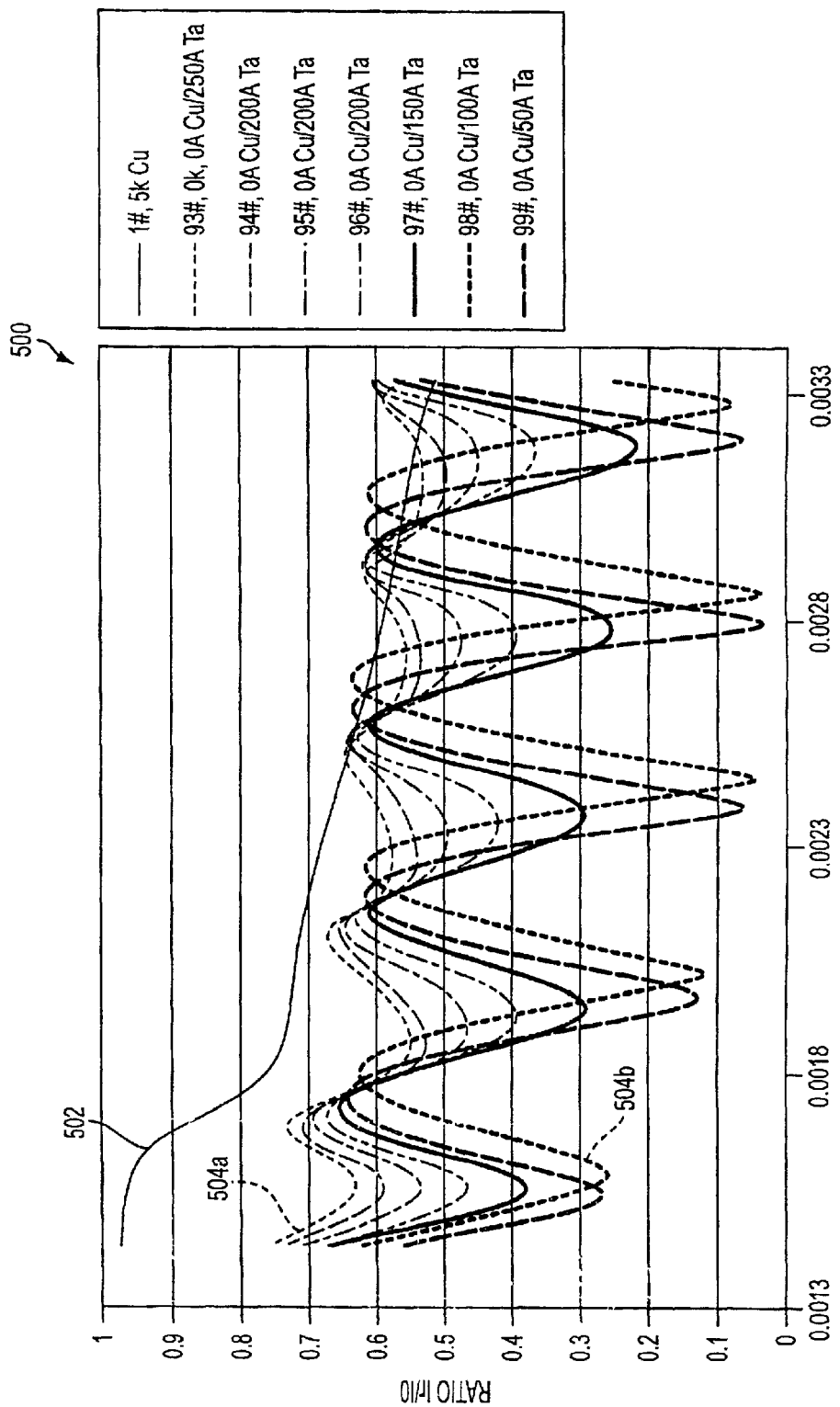
FIG. 5 is spectrum graph showing a broad band reflected spectrum from a wafer at various points in the CMP process, in accordance with an embodiment of the present invention.

FIG. 5 is spectrum graph 500 showing a broad band reflected spectrum from a wafer at various points in the CMP process, in accordance with an embodiment of the present invention. The graph 500 plots the intensity verses $1/\lambda$, where $\lambda$ is the wavelength of light in free space. Plotting intensity as a function of $\lambda$ provides a non-periodic signal when optical interference occurs. Hence, the embodiments of the present invention plot intensity as a function of $1/\lambda$, since intensity plotted as a function of $1/\lambda$ provides a periodic signal when optical interference occurs. Curve 502 shows the reflected spectrum when the copper layer of the wafer is thick, and thus opaque. As previously mentioned, when the copper layer is thick, no interference occurs because the light cannot penetrate the copper layer and thus a phase change does not occur. This is shown by curve 502, which does not show any oscillations. As the copper layer becomes thinner oscillations begin to appear in the reflected spectrum, such as shown in curves 504a and 504b, each representing the reflected spectrum at various points in time when the copper is transparent.

More specifically, graph 500 shows that periodic fringes or oscillations begin appearing in the reflected spectrum in the $1/\lambda$ or 1/nm axis, where nm is $10^{-9}$ Meters, when the copper layer thickness approaches the penetration depth. Each curve in FIG. 5 is an instance of the reflectance spectrum $R(1/\lambda)$ where $\lambda$ is from 300 to 700 nm. The approximate relation for the ratio of the magnitude of electric field of the reflected wave to the incident wave for a single layer of dielectric on a substrate is given by equation (1) below:

$$R(1/\lambda) = r_{01} + r_{12} e^{-12\pi\beta}, \quad (1)$$

where, $r_{01}$ and $r_{12}$ are the Fresnel's coefficients. $\beta$ is the phase angle given by equation (2) below:

$$\beta = 2n_1 d/\lambda, \quad (2)$$

where d is the thickness of the dielectric layer and $n_1$ is the reflective index of the dielectric.

During operation, small variances in the reflectance data can occur because of outside factors. To reduce the effect the variances have on the endpoint detection process, the reflectance data is normalized using a dynamically updated reference. More particularly, the reflectance data signal includes reflections from the wafer, the optical assembly, and any other medium in the optical path-way, such as slurry used during the polishing process. However, embodiments of the present invention perform endpoint detection by analyzing the change in the reflectance data resulting from the optical interference generated as the thin metal zone is approached. Hence, embodiments of the present invention normalize the reflectance data to reduce the influence of ambient light reflected from the optical assembly, and any other medium in the optical pathway. By creating a ratio of the current reflectance data sample with an earlier reflectance data sample, embodiments of the present invention reduce the effect of the ambient light. In particular, such a ratio effectively suppresses much of the ambient light reflected from the optical assembly, and any other medium in the optical path-way. However, the effect of the ambient light reflected from the optical assembly, and any other medium in the optical path-way, changes over time.

Figure 6:
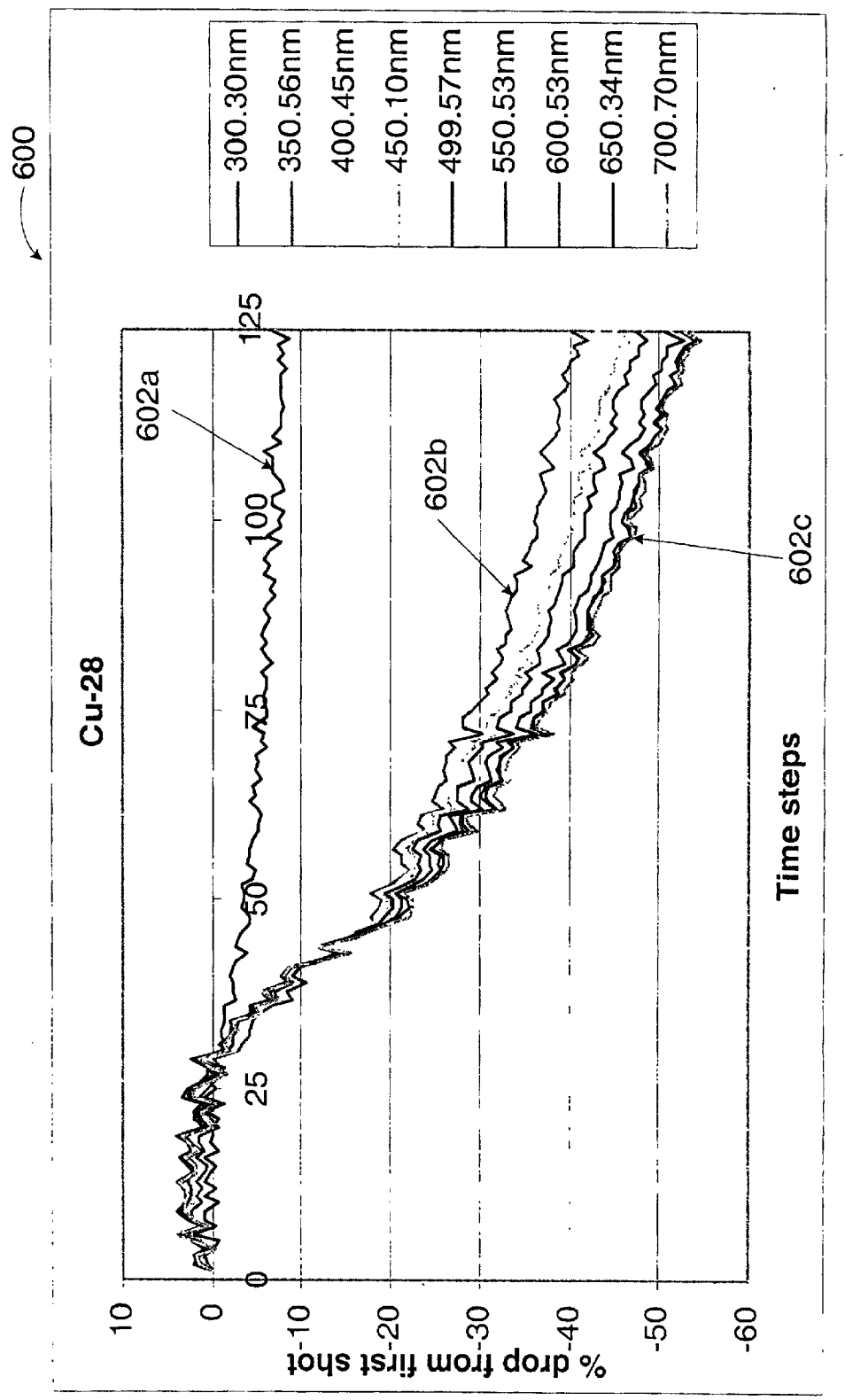
FIG. 6 is a graph showing the change in the reflected data of a copper layer resulting from the change in the character of the optical path over time.

FIG. 6 is a graph 600 showing the change in the reflected intensity of a thick copper layer with respect to the values at the beginning of the CMP process, the variations resulting from the change in the character of the optical path over time. In particular, the graph 600 shows the percentage of change of the reflected data intensity of various wavelengths, for example, wavelengths 602a, 602b, and 602c. As can be seen, the percentage of change varies over time. In addition, the percentage of change is wavelength dependent, varying from one wavelength to another. For example, the changes in wavelength 602a, 602b, and 602 vary from each other. Hence, during the polishing process, the transmission and reflection characteristics of the optical pathway change, for example, due to a thin fluid medium of water and slurry injected between the optical fiber bundle and the wafer.

This dynamically changing composition of water and slurry can make the reference spectrum collected at the beginning of the polishing process unsuitable for normalization at later times during the polishing process. To address this issue, embodiments of the present invention obtain a dynamic reference, which correctly reflects the state of the ambient conditions of reflected light at any instance of time.

Figure 7:
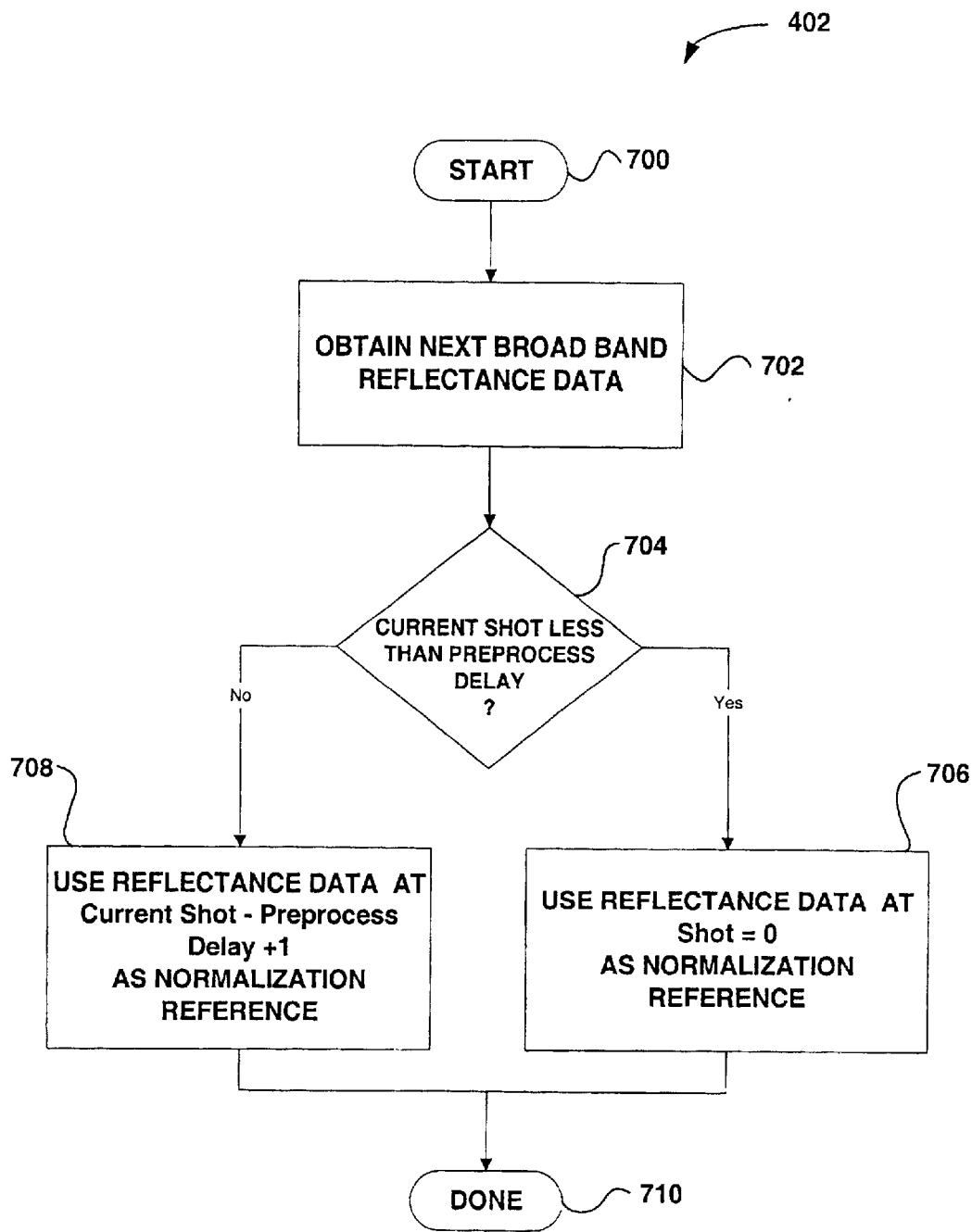
FIG. 7 is a flowchart showing a method for obtaining broad band reflectance data and updating the normalization reference, in accordance with an embodiment of the present invention.

FIG. 7 is a flowchart showing a method 402 for obtaining broad band reflectance data and updating the normalization reference, in accordance with an embodiment of the present invention. In an initial operation 700, preprocess operations are performed. Preprocess operations include obtaining an initial normalization reference, for example, the first reflectance data sample, and other preprocess operations that will be apparent to those skilled in the art. Generally, the initial normalization reference will be used until a preprocess delay is reached in the polishing process, as discussed in greater detail below.

In operation 702, the next broad band reflectance data is obtained. As mentioned above, a portion of the surface of the wafer is illuminated with a broad band Light source to obtain the reflected spectrum data corresponding to the spectrums of light reflected from the illuminated portion of the surface of the wafer. This reflectance data is later analyzed for endpoint detection based on optical interference, as described in greater detail subsequently.

A decision is then made as to whether the current shot in the endpoint detection process is less than the preprocess delay, in operation 704. Embodiments of the present invention continuously collect reflectance data, for example, reflectance data samples can be obtained once every second. Each reflectance data sample is often referred to as a "shot." The trailing reference delay is a predefined number representing the number of "shots" that the normalization reference will trail the current "shot." The preprocess delay is the number of "shots" that will use the first reflectance data sample as the normalization reference, and is equal to the trailing reference delay.

Figure 8A:
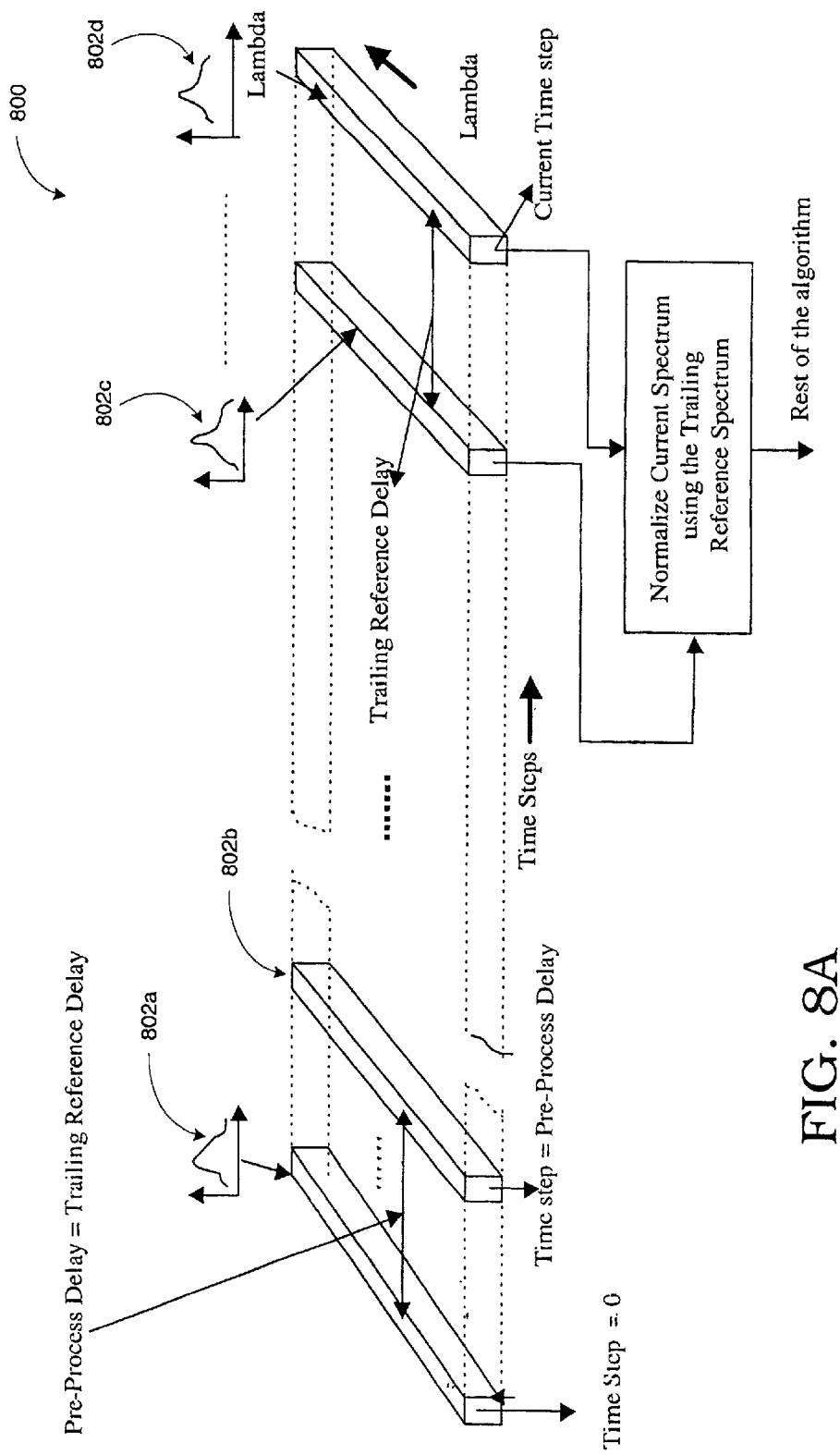
FIG. 8A is a diagram showing a two-dimensional array for storing reflectance data samples, in accordance with an embodiment of the present invention.

FIG. 8A is a diagram showing a two-dimensional array 800 for storing reflectance data samples, in accordance with an embodiment of the present invention. The two-dimensional array 800 includes a plurality of array entries 802a–802d, each array entry 802a–802d comprising an array of reflectance data representing a shot of the wafer at a particular time. In the example of FIG. 8A, array entry 802 represents the first shot and array entry 802b is the shot equal to the preprocess delay. Further, array entry 802d is the current shot and array entry 802c is the shot trailing the current shot 802d by the trailing reference delay. As mentioned above, the trailing reference delay is the number of shots between the current shot and the shot that will be used for normalization, and the preprocess delay is the number of shots that will use the first reflectance data sample as the normalization reference.

Referring back to FIG. 7, if the current shot in the endpoint detection process is less than the preprocess delay, the method 700 continues to operation 706. Otherwise, the method 700 continues to operation 708. In operation 706, the normalization reference is the reflectance data sample at shot 0, which is the fist reflectance data sample. Turning to FIG. 8A, the first reflectance data sample is represented by array entry 802a. Thus, until the polishing process has reached a point at which the current shot equal to or greater than the preprocess delay, array entry 802a is used as the normalization reference.

Referring back to FIG. 7, the normalization reference is updated, in operation 708, when the current shot in the endpoint detection process is equal to or greater than the preprocess delay. In particular, the array entry at the current shot number minus the preprocess delay plus one is used as the normalization reference. As shown in FIG. 8A, the shot used for normalization trails the current shot by an amount defined by the trailing reference delay. As mentioned above, before the trailing reference delay is reached, the initial array entry 802a is utilized for the normalization reference. When the current shot number is equal to or greater than the preprocess delay, the normalization reference is updated. In one embodiment, the normalization reference is updated to the subsequent array entry, which trails the current shot number by an amount equal to the trailing reference delay. The resulting normalization reference is then utilized to normalize the reflectance data to the trailing reference spectrum in operation 404, discussed in greater detail below.

For example, in FIG. 8A, the trailing reference delay can be defined as ten. In this case, the initial array entry 802a is used as the normalization reference until shot ten. When the current shot number is equal to or greater than the preprocess delay, for example on shot ten, the normalization reference is updated using the subsequent array entry, the array entry corresponding to shot 1, as the normalization reference. During shot eleven, the normalization reference is again updated to the subsequent array entry, in this case the array entry corresponding to shot 2. In this manner, the normalization reference number is dynamically updated to better reflect the changing transmission characteristics of the optical pathway.

Figure 8B:
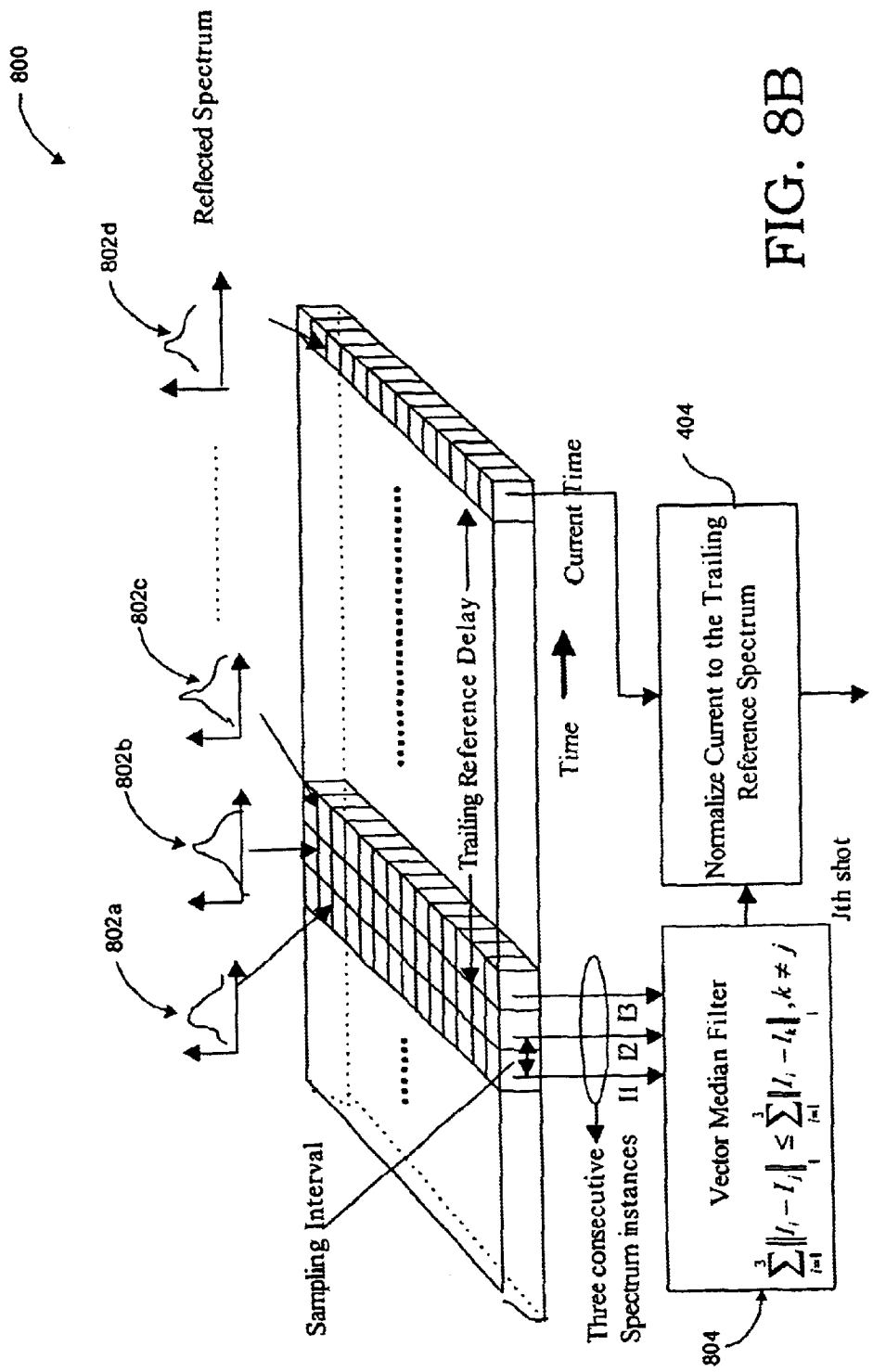
FIG. 8B is a diagram showing a two-dimensional array for storing reflectance data samples, wherein a vector median filter is used for generating the normalization reference, in accordance with an embodiment of the present invention.

To reduce the effects of outlying bad shots caused, for example, by a misaligned belt during a shot, embodiments of the present invention can utilize a vector median filter. FIG. 8B is a diagram showing a two-dimensional array 800 for storing reflectance data samples, wherein a vector median filter 804 is used for generating the normalization reference, in accordance with an embodiment of the present invention. As above, the two-dimensional array 800 includes a plurality of array entries 802a–802d, each array entry 802a–802d comprising an array of reflectance data representing a shot of the wafer at a particular time. Array entries 802a–802c represent consecutive shots of the wafer surface, while array entry 802d represents the current shot of the wafer surface.

As above, the array entry 802b trailing the current array entry 802d by the trailing reference delay is utilized to determine the normalization reference. However, in the embodiment shown in FIG. 8B, two other array entries are also used to determine the normalization reference. In particular, three consecutive array entries 802a–802c are provided to the vector median filter 804. In one embodiment, the array entry 802a prior to, and the array entry 802c subsequent to the array entry 802b trailing the current array entry 802d by the trailing reference delay are provided to the vector median filter 804.

The vector median filter 804 determines the magnitude or scalar distance measure of each array entry 802a–802c by summing the square of each pixel value. The scalar measures of the three array entries 802a–802c are then sorted in ascending order, and the array entry in the middle is selected as the normalization reference. The resulting normalization reference is then utilized to normalize the reflectance data to the trailing reference spectrum in operation 404, discussed in greater detail subsequently. In this manner, the vector median filter 804 determines the median value of three array entries to use for the normalization reference, thus preventing outlying values from affecting the normalization process.

Referring back to FIG. 4, the reflectance data is normalized in operation 404. Normalizing the reflectance data reduces the sample to sample variations in the data. As mentioned previously, when the endpoint window in the polishing belt moves over the endpoint detection sensor, the surface of the wafer is illuminated by broad band light and the light reflected from the wafer surface is recorded as reflectance data. Since small variances in the data can occur because of outside factors, the reflectance data is normalized to reduce the effect the variances have on the endpoint detection process.

As mentioned above, the reflectance data signal includes reflections from the wafer, the optical assembly, and any other medium in the optical path-way, such as slurry used during the polishing process. That is, M=C+N, where M is the total measured signal, C corresponds to signal from light reflected from the wafer, and N is the normalization signal. During normalization, the measured signal at each wavelength is divided by the normalization signal acquired through a reference spectrum, and unity is subtracted from this quotient to remove constant bias, as illustrated in equation (3) below:

$$R=(M/N)-1=((C+N)/N)-1=C/N$$

In operation 406, the normalized reflectance data is de-trended using a polynomial fit. De-trending stretches out the reflectance curve to reduce oscillations present when the copper layer is still opaque, which can be caused by factors other than optical interference from the underlying wafer layers. To this end, a polynomial is fitted to the reflectance data and then later subtracted out. In this manner, the reflectance data curve begins essentially flat, thus allowing for easier detection of oscillations: caused by the optical interference of the various layers of the wafer.

In operation 408, a moving average filter is applied along the $1/\lambda$ axis. Typically, an amount of high frequency noise is present in the reflectance data curve. The high frequency noise can adversely affect the endpoint detection process. Thus, a filter is applied to the curve to reduce the high frequency noise.

A derivative transform is then applied to the reflectance data in operation 410. Generally, a constant bias, or DC, is present in the reflectance data collected from the wafer surface. Since the constant bias in the reflected spectrum can be large, the Fourier transform can be dominated by a large peak at the origin. This can dominate and obscure the peaks at the higher regions of the spectrum, which are of primary interest. By applying the derivative transformation to the reflectance data, the constant bias can be reduced or eliminated. In graphical terms, the reflectance data curves can be zero centered by removing the constant bias.

A spectral window is then applied to the reflectance data in operation 412. The spectral window smoothes truncation discontinuities at the edges of the curves. The spectral window helps to reduce spectral leakage in the Fourier Spectrum caused by discontinuities at the edges of the reflected spectrum, which generally occur when the reflected spectrum contains a non-integer number of cycles or oscillations.

Zero padding is then applied to the reflectance data in operation 414. Zero padding of the reflected spectrum data helps to zoom the Fourier Transform onto a higher resolution grid. This procedure essentially does an interpolation of the Fourier Transform on to a finer grid. This, in turn, enables increased accuracy in peak detection, as performed later in the method 400. In one embodiment, Zero padding is performed by extending the number of discrete pixels of the reflected spectrum to a much larger grid. Any pixels in the extended grid not covered by the actual acquired data are can be filled with a value of zero.

In operation 416, a Fourier Transform is applied to the reflectance data. The Fourier Transform breaks down the signal into multiple components. Hence, the Fourier Transform can be used to better detect the occurrence of an oscillating pattern in the reflected spectrum.

Figure 9:
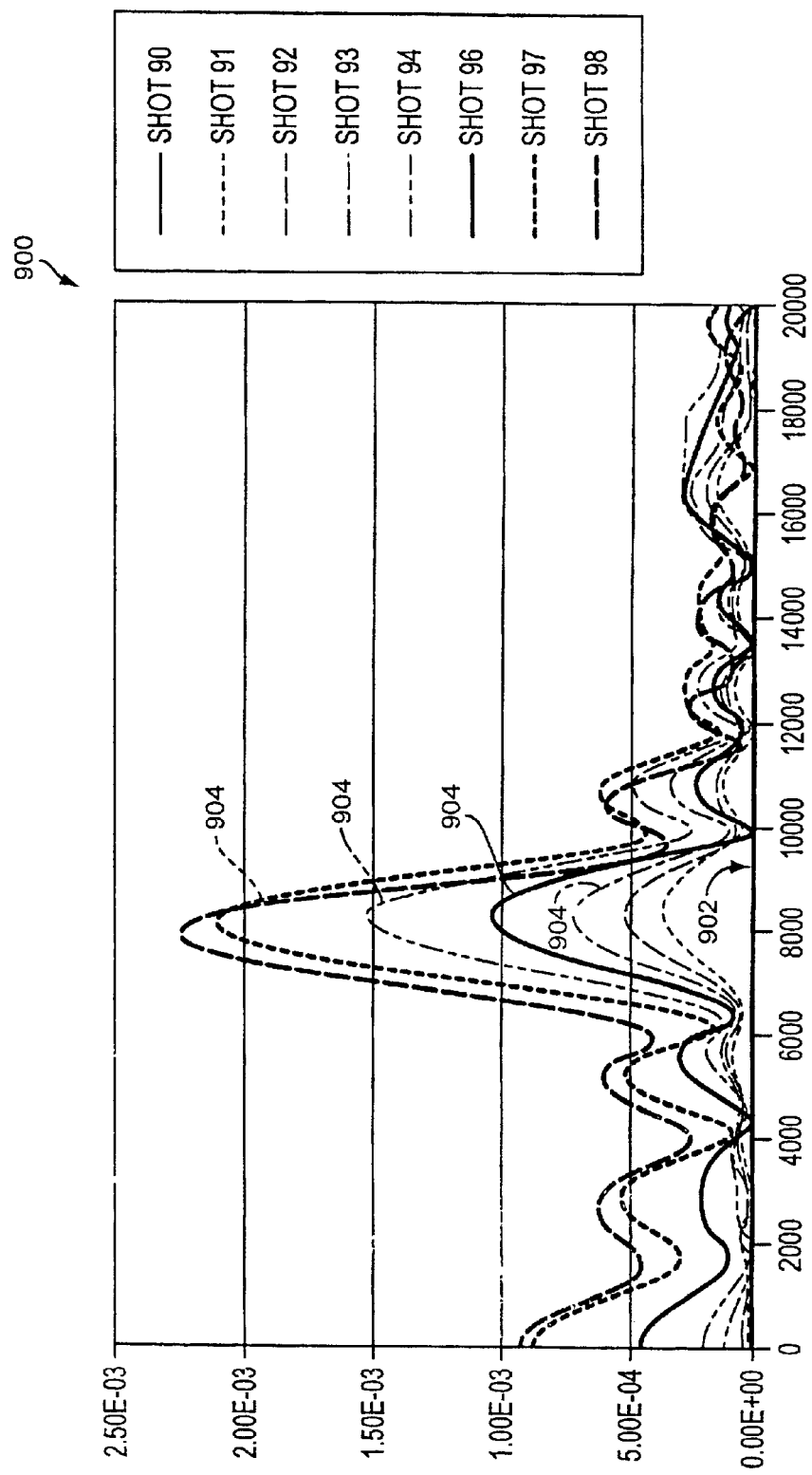
FIG. 9 is graph showing a Fourier Transform of the reflectance data where the underlying dielectric layer has a thickness in the range of 6000–100000 Å, in accordance with an embodiment of the present invention.

FIG. 9 is graph 900 showing a Fourier Transform of the reflectance data where the underlying dielectric layer has a thickness in the range of 6000–10000 Å, in accordance with an embodiment of the present invention. The Fourier Transform graph 900 includes an opaque copper reflectance curve 902, wherein the thickness of copper layer on the wafer surface is very large compared to the penetration depth, and thin metal curves 904, wherein the copper layer is very thin compared to the penetration depth. In equations (1) and (2) above, the thickness d and the wave-number $1/\lambda$ are related through the phase expression. Thus, the Fourier Transform of $R(1/\lambda)$ maps to the space of d:

$$R^F(d)=F\{R(1\lambda)\}\leftarrow\rightarrow R(1/\lambda)$$

The Fourier Transform graph 900 of FIG. 9 shows $R^F(d)$ for various instances of time during a CMP process. As can be seen from the Fourier Transform graph 900, at the time instances where the copper thickness is very large compared to the penetration depth, curve 902, the magnitude of the Fourier Transform Graph 900 within the thickness range of the dielectric, 6000–10000 Å, is very small. When the polish reaches the penetration depth, a significant peak begins to appear within the dielectric thickness range, as shown by the thin metal curves 904. As shown by the Fourier Transform Graph 900, the peak values for the thin metal curves 904 appear at about 8000 Å, which in this example is the thickness of the dielectric layer below the copper layer.

In other embodiments, where the wafer structures are more complicated, the primary peaks of the Fourier Transform represent the geometrical layout of the layered structure. For example, in a two layer structure with thickness $d_1$ and $d_2$, the primary property to detect and flag the first instance during the CMP process when a metal layer reaches the thin metal zone. For copper the penetration depth is about 500 Å and for Tungsten it is about 800 Å.

Figure 10:
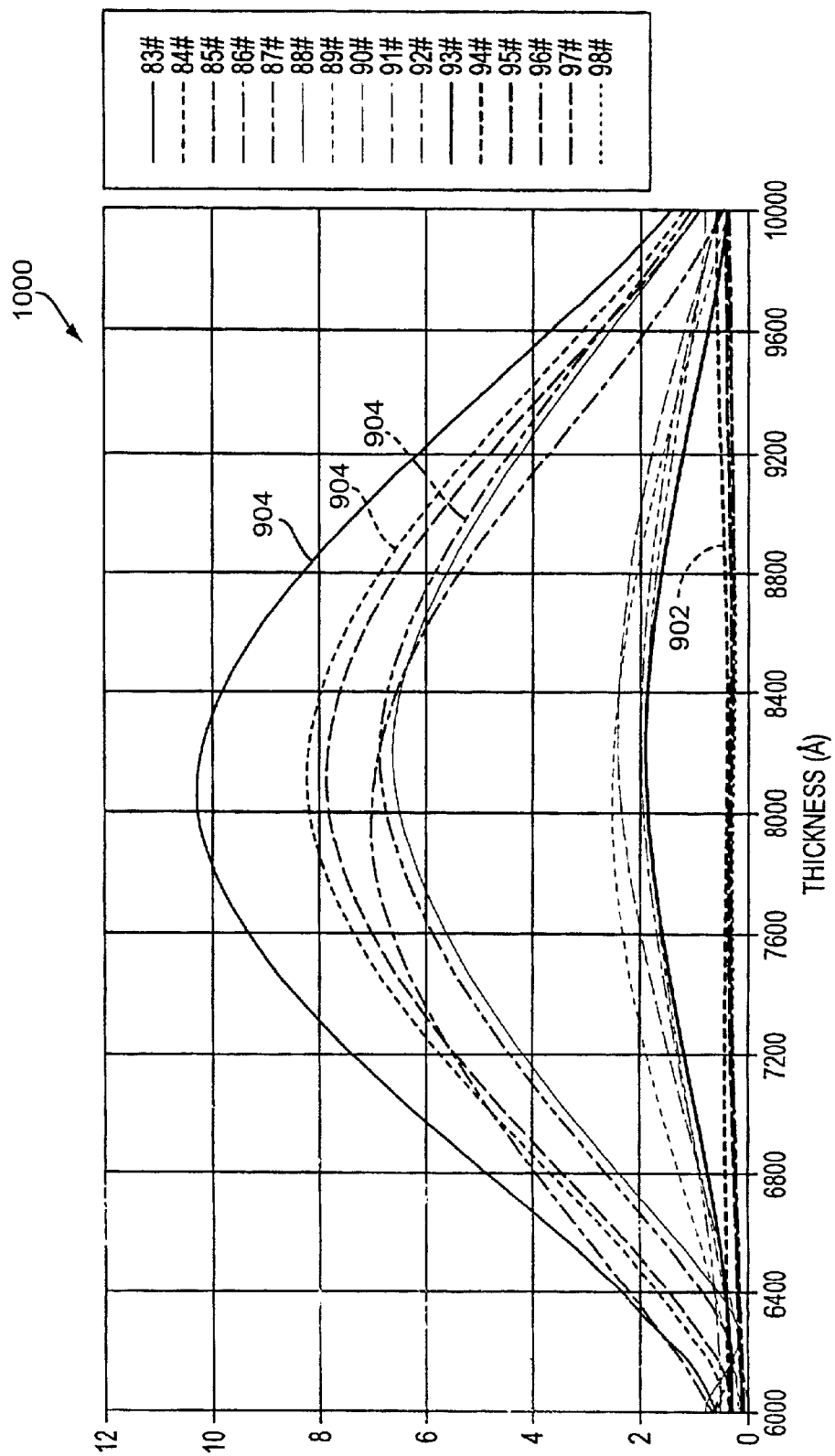
FIG. 10 is a Fourier Window showing Fourier Transforms of reflectance data curves in a specific thickness bounds for various instances of time, in accordance with an embodiment of the present invention.

Referring back to FIG. 4, a specific number of peaks are found in the Fourier Transform spectrum within predetermined thickness bounds. When the thickness of the underlying dielectric layer is known, a window can be focused on an area of the graph that covers the dielectric thickness. FIG. 10 is a Fourier Window 1000 showing Fourier Transforms of reflectance data curves in a specific thickness bounds for various instances of time. In the example of FIG. 10, the thickness of the dielectric layer below the copper layer is in the range of 6000–100000 Å. Thus, the Fourier window 1000 is configured to show the Fourier Transform of the reflectance data curves within a thickness established by a low thickness bound (LTB) of 6000 Å and a high thickness bound (HTB) of 10,000 Å. Thus, referring back to FIG. 4, during operation 418 a predetermined number of peaks are found between the thickness bounds defined by LTB and HTB.

Figure 11:
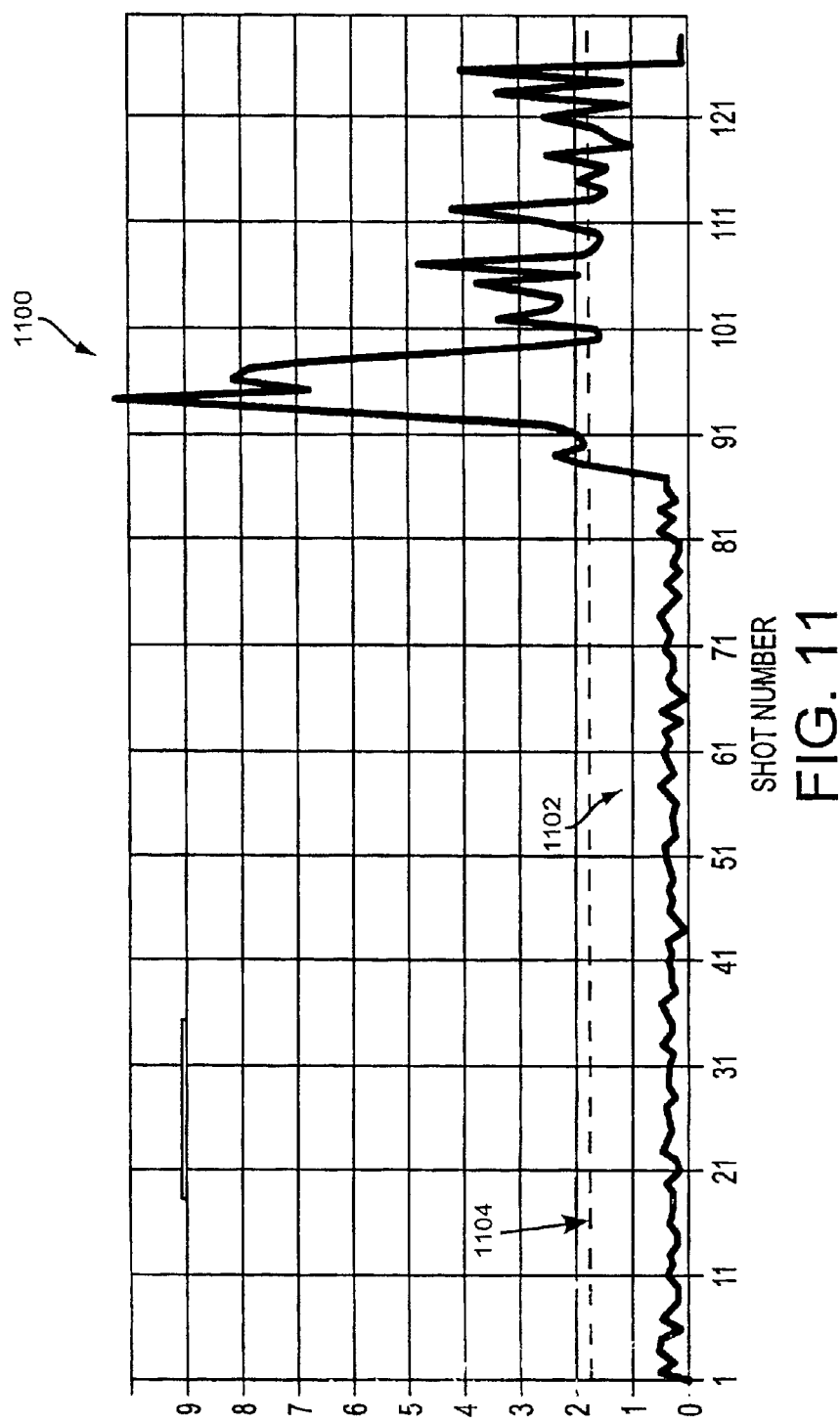
FIG. 11 is a graph showing the EPD signal found during operation as a function of time.

Next, in operation 420, the magnitudes of the peaks found in operation 418 are summed. The sum of the magnitudes of the peaks found in operation 418 is referred to as the endpoint detection (EPD) signal. FIG. 11 is a graph 1100 showing; the EPD signal found during operation 418 as a function of time, which is shown as the shot number. The shot number represents the sequence of the reflectance data obtained during consecutive iterations of the endpoint detection process. As shown from graph 1100, the EPD signal 1102 remains low during the earlier stages of the CMP process, in this example, during shots 1 to about 84. Then, as the copper approaches the thin metal zone at about shot 90, the peak magnitude curve 1102 rises sharply because of the oscillations occurring in the reflected spectrum data as a result of optical interference when the copper layer becomes thin and transparent.

Referring back to FIG. 4, a decision is made as to whether the EPD signal is greater than a predefined threshold, in operation 422. The threshold is generally selected so as to estimate when the thin metal zone has been reached. As shown in FIG. 11, the threshold 1104 is selected such that the threshold 1104 is high relative to the EPD signal when the thickness of metal layer is large compared to the penetration depth. Further, the threshold 1104 selection preferably takes into consideration the trailing reference delay.

Figure 12:
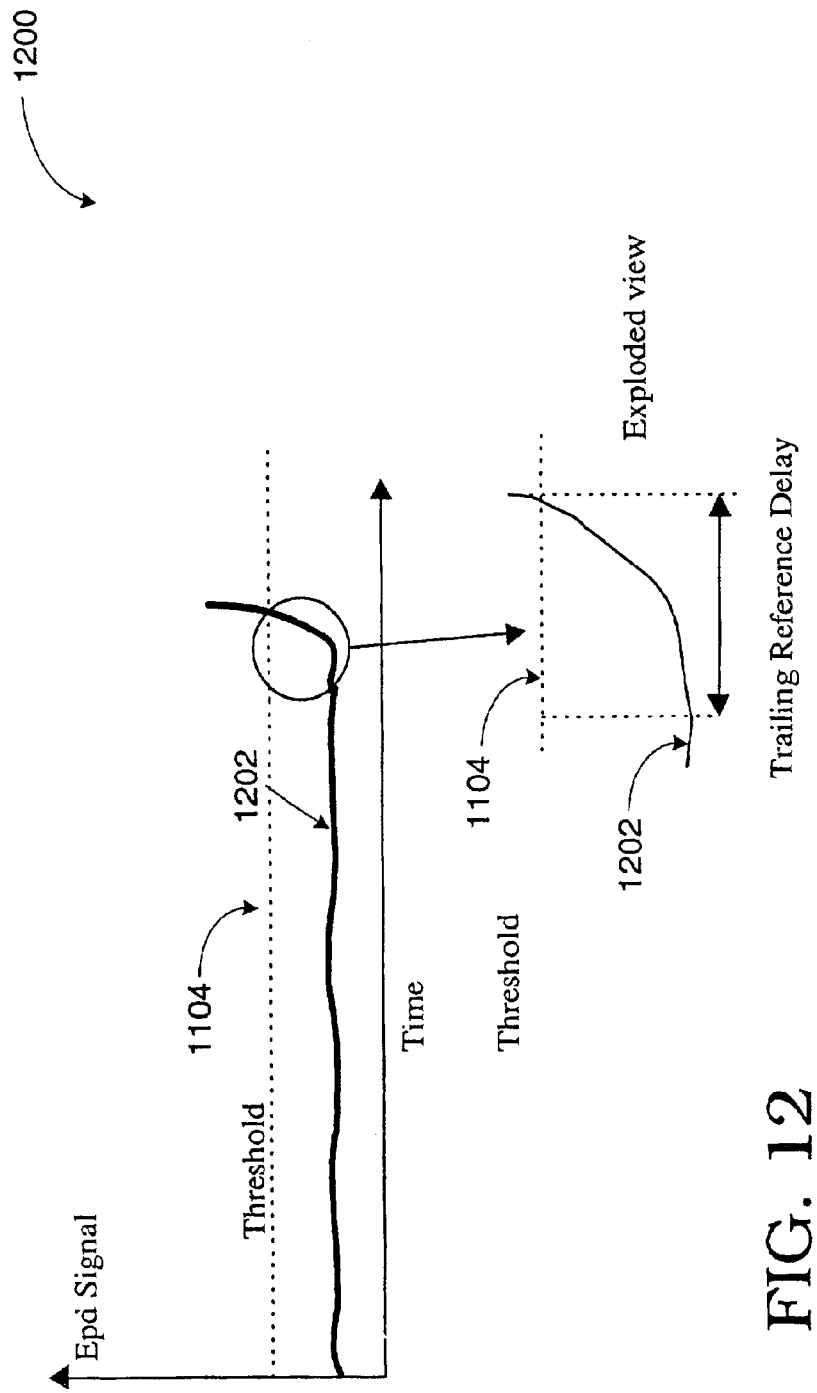
FIG. 12 is a graph showing the EPD signal found during operation as a function of time in view of the trailing reference delay.

FIG. 12 is a graph 1200 showing the EPD signal found during operation 418 as a function of time. As above, the EPD signal 1202 remains low during the earlier stages of the CMP process, in this example, during shots 1 to about 84. Then, as the copper approaches the thin metal zone, the EPD signal 1202 rises sharply, causing the EPD signal 1202 to breach the threshold 1104. To ensure proper normalization, embodiments of the present invention generally utilize a trailing reference delay that is greater than the time required to traverse the last bend in the EPD signal 1202 before the EPD signal 1202 breaches the threshold 1104. This ensures the dynamic update procedure to include only reflectance data obtained prior to reaching the thin metal zone.

Turning back to FIG. 4, the method 400 continues to obtain the next broad band reflectance data in operation 402 if the EPD signal found in operation 418 is less than the predefined threshold. Otherwise, the method 400 is completed in operation 424.

Figure 13:
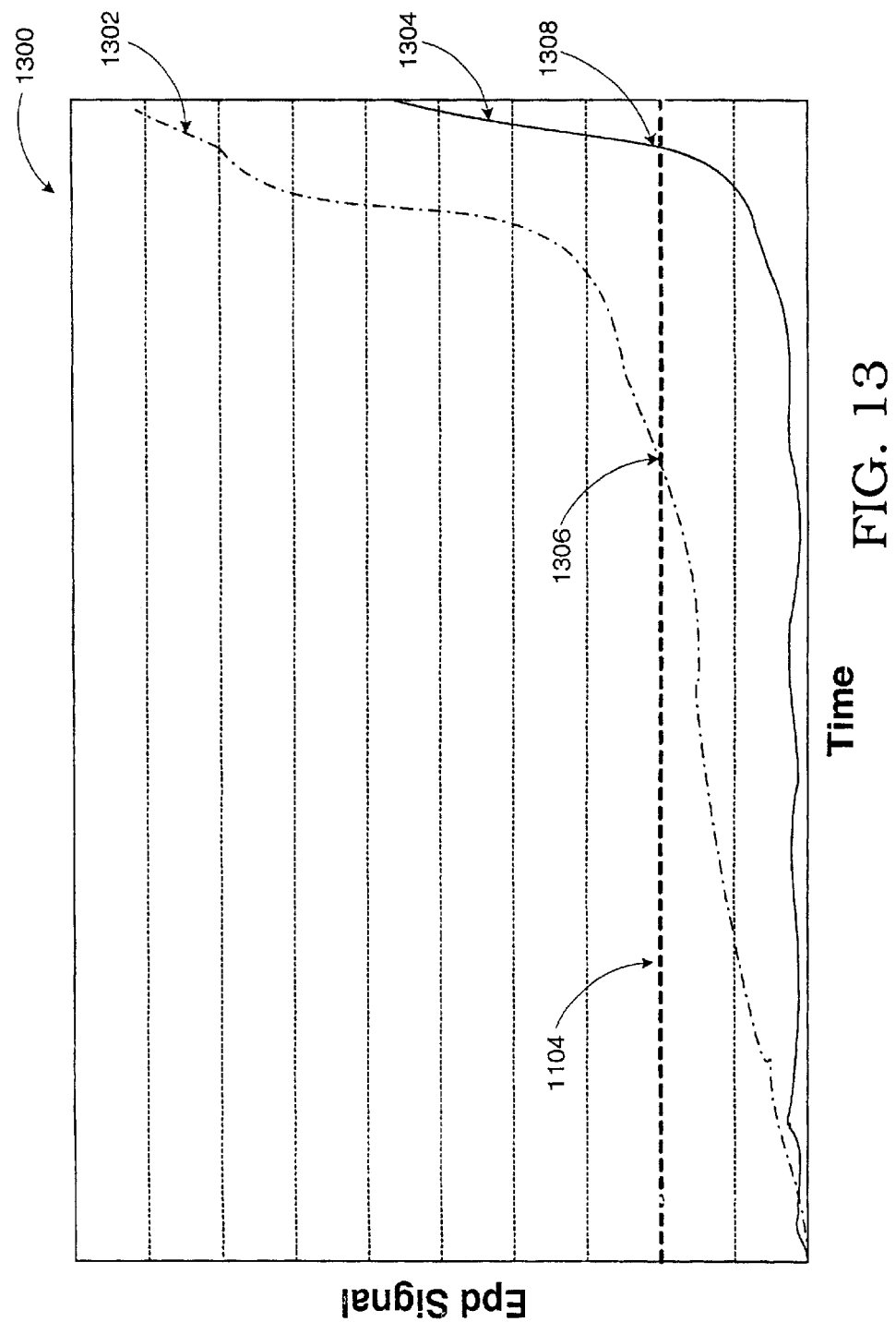
FIG. 13 is a graph comparing the EPD signal found using a static normalization reference to the EPD signal found using a dynamic normalization reference.

The CMP process is terminated in operation 424, since at this point the endpoint has been reached. Advantageously, the dynamic normalization reference of the embodiments of the present invention reduces endpoint detection error by addressing the changing characteristics of the extraneous ambient light in the optical path, as illustrated in FIG. 13. FIG. 13 is a graph 1300 showing the EPD signal found during operation 418 using a static normalization reference and using a dynamic normalization reference. In particular, EPD signal 1302 results from using a static normalization reference, which comprises the initial reflectance data shot. EPD signal 1304 results from using a dynamic normalization reference, which comprises a continuously updated trailing reference as described above with reference to FIGS. 7, 8A, and 8B. The changing characteristics of the extraneous ambient light in the optical path reduce the applicability of the static normalization reference at later times in the endpoint detection process. As a result, EPD signal 1302 can drift higher on the graph, eventually crossing the threshold 1104 at a point 1306 before the actual endpoint 1308 has been reached in the polishing process. As a result, a false endpoint can be detected when using a static normalization reference. However, the dynamic normalization reference of the embodiments of the present invention reduces endpoint detection error by addressing the changing characteristics of the extraneous ambient light in the optical path through continuous updating of the normalization reference.

In other embodiments of the present invention, statistical hypothesis tests applied to the EPD signal can be used to determine when the thin metal zone has been reached. Since the embodiments of the present invention use optical interference instead of mere changes in the surface reflectivity as in conventional endpoint detection, the embodiments of the present invention advantageously provide increased sensitivity and robustness in endpoint detection. In addition to endpoint detection, the embodiments of the present invention advantageously can be used to determine the thickness of the layers in the wafer. Conventionally, an off line metrology tool was needed to measure the thickness of the layers of the wafer. The embodiments of the present invention can measure the thickness of the layers of the wafer without needing to remove the wafer and measure from a separate machine.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for detecting an endpoint during a chemical mechanical polishing (CMP) process, comprising the operations of:

receiving a current reflected spectrum data sample corresponding to a plurality of spectrums of light reflected from an illuminated portion of a surface of a wafer;

normalizing the current reflected spectrum data sample using a normalization reference comprising a first reflected spectrum data sample obtained earlier during the CMP process; and updating the normalization reference using a second reflected spectrum data sample obtained earlier during the CMP process, wherein the second reflected spectrum data sample is obtained after the first reflected spectrum data sample.

2. A method as recited in claim 1, further comprising the operation of determining an endpoint based on optical interference occurring in the reflected spectrum data.

3. A method as recited in claim 1, wherein the first reflected spectrum data sample trails the current reflected spectrum data sample by a predetermined trailing reference delay.

4. A method as recited in claim 3, wherein the trailing reference delay is a number representing an amount of reflectance data samples between the current reflected spectrum data sample and the first reflected spectrum data sample.

5. A method as recited in claim 3, further comprising the operation of receiving a new current reflected spectrum data sample corresponding to a plurality of spectrums of light reflected from the illuminated portion of the surface of the wafer at a later time.

6. A method as recited in claim 5, wherein the second reflected spectrum data sample trails the new current reflected spectrum data sample by the trailing reference delay.

7. A method as recited in claim 2, wherein the optical interference is a result of phase differences in light reflected from different layers of the wafer.

8. A method as recited in claim 7, wherein the optical interference occurs when a top metal layer is reduced to a thin metal zone.

9. A method as recited in claim 8, further comprising the operation of determining when oscillations occur in a plot of wave-numbers based on the reflected spectrum data.

10. A method as recited in claim 9, wherein the endpoint occurs when the oscillations in the plot of wave-numbers occurs.

11. A method for detecting an endpoint during a chemical mechanical polishing (CMP) process, comprising the operations of:

receiving a current reflected spectrum data sample corresponding to a plurality of spectrums of light reflected from an illuminated portion of a surface of a wafer;

selecting a first median reflected spectrum data sample from a first plurality of reflected spectrum data samples obtained earlier during the CMP process;

normalizing the current reflected spectrum data sample using a normalization reference comprising the median reflected spectrum data sample; and updating the normalization reference using a second median reflected spectrum data sample selected from a second plurality of reflected spectrum data samples obtained earlier during the CMP process.

12. A method as recited in claim 11, further comprising the operation of determining an endpoint based on optical interference occurring in the reflected spectrum data.

13. A method as recited in claim 11, wherein the first plurality of reflected spectrum data samples comprise three consecutive reflected spectrum data samples obtained earlier during the CMP process.

14. A method as recited in claim 13, wherein one of the first plurality of reflected spectrum data samples trails the current reflected spectrum data sample by a predetermined trailing reference delay.

15. A method as recited in claim 14, wherein the trailing reference delay is a number representing an amount of reflectance data samples between the current reflected spectrum data sample and one of the first plurality of reflected spectrum data samples.

16. A method for detecting an endpoint during a chemical mechanical polishing process, comprising the operations of:

illuminating a portion of a surface of a wafer with broad band light;

receiving a current reflected spectrum data sample corresponding to a plurality of spectrums of light reflected from the illuminated portion of the surface of the wafer;

normalizing the current reflected spectrum data sample using a normalization reference comprising a first reflected spectrum data sample obtained earlier during the CMP process;

determining an endpoint based on optical interference occurring in the reflected spectrum data; and updating the normalization reference using a second reflected spectrum data sample obtained earlier during the CMP process, wherein the second reflected spectrum data sample is obtained after the first reflected spectrum data sample.

17. A method as recited in claim 16, wherein the first reflected spectrum data sample trails the current reflected spectrum data sample by a predetermined trailing reference delay.

18. A method as recited in claim 17, wherein the trailing reference delay is a number representing an amount of reflectance data samples between the current reflected spectrum data sample and the first reflected spectrum data sample.

19. A method as recited in claim 18, further comprising the operation of receiving a new current reflected spectrum data sample corresponding to a plurality of spectrums of light reflected from the illuminated portion of the surface of the wafer at a later time.

20. A method as recited in claim 19, wherein the second reflected spectrum data sample trails the new current reflected spectrum data sample by the trailing reference delay.

* * * * *